ized Patent [19]

Stephan et al.

[11] 4,014,863
[45] Mar. 29, 1977

[54] WATER-INSOLUBLE AZO-PYRIMIDINE PIGMENTS

[75] Inventors: Günter Stephan, Schildgen; Karl Heinz Schündehütte, Opladen, both of Germany

[73] Assignee: Bayer Aktiengesellschaft, Leverkusen, Germany

[22] Filed: Oct. 9, 1974

[21] Appl. No.: 513,486

[30] Foreign Application Priority Data

Oct. 12, 1973 Germany .................... 2351294

[52] U.S. Cl. .................. 260/154; 106/97; 260/152; 260/251 R
[51] Int. Cl.² .................. C09B 29/36; C04B 7/02; D06P 3/26; D06P 3/54
[58] Field of Search .................... 260/154

[56] References Cited

UNITED STATES PATENTS

| | | | |
|---|---|---|---|
| 2,675,375 | 4/1954 | Marson et al. | 260/154 |
| 3,481,918 | 12/1969 | Straley et al. | 260/154 |
| 3,609,136 | 9/1971 | Wegmuller et al. | 260/154 |
| 3,624,065 | 11/1971 | Spiess et al. | 260/146 D |

FOREIGN PATENTS OR APPLICATIONS

| | | | |
|---|---|---|---|
| 1,060,797 | 3/1967 | United Kingdom | 260/154 |
| 1,076,037 | 7/1967 | United Kingdom | 260/154 |
| 837,338 | 6/1960 | United Kingdom | 260/154 |

*Primary Examiner*—Daniel E. Wyman
*Assistant Examiner*—John J. Doll
*Attorney, Agent, or Firm*—Plumley and Tyner

[57] ABSTRACT

Azo pigments which are free from groups which confer solubility in water and correspond to the formula

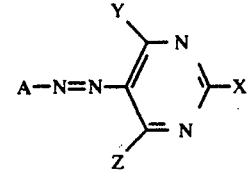

wherein A represents the radical of a diazo component, X represents a hydroxy, cyanamino, ureido, acylamino or guanidino group and Y and Z independently of one another denote a hydroxyl group or an optionally substituted amino group with the proviso that at most 2 of the 3 radicals X, Y and Z represent a hydroxyl group, are suitable for pigmenting lacquers, for the preparation of printing inks, distempers or paints containing binders and for the bulk dyeing of synthetic, semi-synthetic or natural macromolecular substances.

7 Claims, No Drawings

WATER-INSOLUBLE AZO-PYRIMIDINE PIGMENTS

The invention relates to azo pigments which are free from groups which confer solubility in water, such as carboxylic acid groups and sulphonic acid groups. They correspond to the general formula I

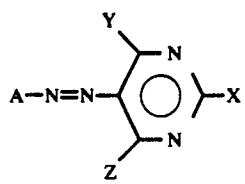

wherein
A represents the radical of a diazo component,
X represents a hydroxyl, cyanamino, ureido, acylamino, or guanidino group and
Y and Z independently of one another denote a hydroxyl group or an optionally substituted amino group, with the proviso that at most 2 of the 3 radicals X, Y and Z represent a hydroxyl group.

Possible substituents of the amino groups Y and Z are alkyl and aryl radicals.

By acylamino groups X there are understood, for example, alkylcarbonylamino, arylcarbonylamino, aralkylcarbonylamino, alkylsulphonylamino, arylsulphonylamino and aralkylsulphonylamino radicals.

Preferably, A denotes the radical of a diazotisable aromatic amine of the benzene, naphthalene, anthraquinone or heterocyclic series, for example of the thiazole, benzthiazole, carbostyril, quinazoline or dibenzofurane series. The radical A can be substituted further, for example by halogen atoms, especially chlorine or bromine, or by alkyl, alkoxy, phenoxy, trifluoromethyl, nitrile, nitro, alkylsulphonyl, arylsulphonyl, aralkylsulphonyl, aminocarbonyl, alkylaminocarbonyl, phenylaminocarbonyl, aminosulphonyl, alkylaminosulphonyl, phenylaminosulphonyl, alkylcarbonylamino, arylcarbonylamino, alkylsulphonylamino or arylsulphonylamino groups.

In the abovementioned meaning of substituents for A and X, alkyl and alkoxy represent, in preferred embodiments, groups with 1 to 4 C atoms. Aryl preferably denotes phenyl. Aralkyl preferably denotes phenyl-$C_1$-$C_4$-alkyl.

Preferred pigments are those of the formula II

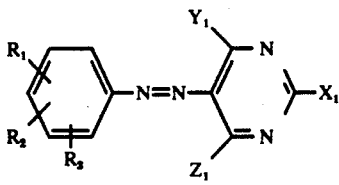

wherein
$X_1$ denotes amino, cyanamino, acetylamino, guanidino, ureido or hydroxyl,
$Y_1$ and $Z_1$ denote hydroxyl or amino, with the proviso that at most 2 of the 3 radicals $X_1$, $Y_1$ and $Z_1$ represent hydroxyl, $R_1$ represents hydrogen, nitro, chlorine, bromine, $C_1$-$C_4$-alkyl, $C_1$-$C_4$-alkoxy, nitrile, $C_1$-$C_4$-alkylsulphonyl, trifluoromethyl, phenylsulphonyl, benzylsulphonyl, phenoxy, carbo-$C_1$-$C_4$-alkoxy, carbophenoxy, carbonamido, $C_1$-$C_4$-alkylcarbonylamino, benzoylamino or sulphonamido, and the carbonamide and sulphonamide groups can be monosubstituted or disubstituted by $C_1$-$C_4$-alkyl, optionally substituted phenyl or benzyl, and $R_2$ and $R_3$ represent hydrogen, chlorine, $C_1$-$C_4$-alkyl, carbo-$C_1$-$C_4$-alkoxy, carbonamide, which can be mono-substituted or disubstituted by $C_1$-$C_4$-alkyl, optionally substituted phenyl or benzyl, or $C_1$-$C_4$-alkoxy.

Particularly preferred pigments correspond to the formula III

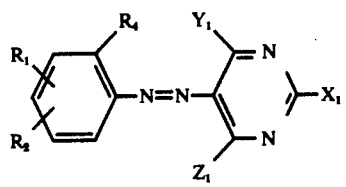

wherein
$R_1$, $R_2$, $X_1$, $Y_1$ and $Z_1$ have the abovementioned meaning and
$R_4$ represents carbo-$C_1$-$C_4$-alkoxy and $C_1$-$C_4$-alkoxy.

Very particularly preferred pigments are those of the formula IV

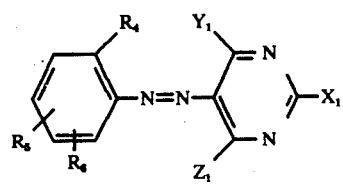

wherein
$X_1$, $Y_1$, $Z_1$ and $R_4$ have the abovementioned meaning,
$R_5$ can represent hydrogen, chlorine, methyl, ethyl, methoxy, ethoxy, nitrile, carbo-$C_1$-$C_4$-alkoxy, or carbonamide which is unsubstituted or monosubstituted or disubstituted by methyl or phenyl and
$R_6$ can represent hydrogen, chlorine, methyl or methoxy.

Examples of suitable diazo components are 2-nitroaniline, 3-nitroaniline, 4-nitroaniline, 2,4-dinitroaniline, 2-chloro-4-nitroaniline, 4-chloro-2-nitroaniline, 2-chloro-5-nitroaniline, 2-nitro-4-methylaniline, 2-methyl-4-nitroaniline, 2-methyl-5-nitroaniline, 4-methoxy-2-nitroaniline, 2-cyano-4-nitroaniline, 2-bromo-4-nitroaniline, 2-nitro-4-chloroaniline, 2-nitro-4-methylsulphonyl-aniline, 2-nitro-4-ethylsulphonylaniline, 2-chloroaniline, 4-chloroaniline, 2,4-dichloroaniline, 2,5-dichloroaniline, 2,6-dichloroaniline, 3,4-dichloroaniline, 3,5-dichloroaniline, 2,4,5-trichloroaniline, 2,4,6-trichloroaniline, 2-cyano-5-chloroaniline, 2-methyl-4-chloroaniline, 2-methyl-5-chloroaniline, 2,4-dichloro-5-ethylaniline, 2,5-dichloro-4-methylaniline, 2-chloro-4-methylsulphonylaniline, 2-cyano-5-chloroaniline, 2,4-dichloro-5-methoxyaniline, 2-chloro-5-trifluoromethylaniline, 4-chloro-2-trifluoromethylaniline, 3,5-bis-trifluoromethylaniline, 2,4-dimethoxyaniline, 2,5-dimethoxyaniline, 2,5-diethoxyaniline, 2,4-dimethoxy-5-chloroaniline, 2,5-dimethoxy-4-chloroaniline, 2-methoxy-5-methylaniline, 4-methoxy-2-methylaniline, 2-methoxy-5-methyl-4-chloroaniline, 2-methoxy-4-nitroaniline, 4-methoxy-2-nitroaniline, 2-methoxy-5-nitroaniline, 2,5-dimethoxy-4-nitroaniline, 2-methoxy-5-methyl-4-nitroaniline, 2-methoxy-5-chloro-4-nitroaniline, 2-methoxy-5-ethylsulphonylaniline, 2-methoxy-5-phenylsulphonylaniline, 2-methoxy-5-benzylsulphonylaniline, 2-methoxy-4-chloroaniline, 2-ethoxy-4-chloroaniline, 2-methoxy-5-chloroaniline, 2-ethoxy-5-chloroaniline, 2-methoxy-4,5-dichloroaniline, 2-amino-5-chlorodiphenyl ether, 2-amino-4,4'-dichlorodiphenyl ether, 2-amino-4,6-dichlorodiphenyl ether, 4-amino-5-methoxy-benzenesulphonic acid 4-nitrophenyl ester, 5-acetylamino-2-nitroaniline, 5-acetylamino-2-chloro-5-methylaniline, 4-acetylamino-2,5-dichloroaniline, 5-acetylamino-2,4-dichloroaniline, 4-benzoylamino-2-methyl-5-methoxyaniline, 5-benzoylamino-2-chloroaniline, 4-benzoylamino-2-chloro-5-methoxyaniline, 2-amino-benzoic acid methyl ester, 2-amino-benzoic acid ethyl ester, 2-amino-benzoic acid isobutyl ester, 4-chloro-2-amino-benzoic acid methyl ester, 5-chloro-2-amino-benzoic acid methyl ester, 6-chloro-2-aminobenzoic acid methyl ester, 3,5-dichloro-2-aminobenzoic acid methyl ester, 4,6-dichloro-2-amino-benzoic acid methyl ester, 5-bromo-2-amino-benzoic acid methyl ester, 4-nitro-2-aminobenzoic acid methyl ester, 5-nitro-2-amino-benzoic acid methyl ester, 4-methyl-2-amino-benzoic acid methyl ester, 5-methyl-2-amino-benzoic acid methyl ester, 6-methyl-2-amino-benzoic acid methyl ester, 4-trifluoromethyl-2-amino-benzoic acid methyl ester, 4-methoxy-2-amino-benzoic acid methyl ester, 4-methoxy-3-amino-benzoic acid phenyl ester, 4-methoxycarbonyl-2-amino-benzoic acid methyl ester, 4-carbamoyl-2-amino-benzoic acid methyl ester, 4-acetylamino-2-amino-benzoic acid methyl ester, 4-benzoylamino-2-amino-benzoic acid methyl ester, 4-(2', 5'-dichloro-benzoylamino)-2-amino-benzoic acid methyl ester, 4-sulphamoyl-2-amino-benzoic acid methyl ester, 2-amino-naphthalene-3-carboxylic acid methyl ester, 2-aminoanthraquinone-2-carboxylic acid methyl ester, 4-methyl-3-amino-benzoic acid methyl ester, 1-aminobenzene-2,5-dicarboxylic acid dimethyl ester, 1-aminobenzene-3,5-dicarboxylic acid dimethyl ester, 4-amino-benzoic acid amide, 4-chloro-3-aminobenzoic acid amide, 4,6-dichloro-3-amino-benzoic acid amide, 3-amino-4-methoxy-benzoic acid amide, 3-amino-4-methoxybenzoic acid phenylamide, 3-amino-4-methyl-benzoic acid methylamide, 3-amino-4-methyl-benzoic acid 2',4'-dimethyl-phenylamide, 1-amino-benzene-3,5-dicarboxylic acid diamide, 3-amino-4-methylbenzoic acid 2',5'-dichloro-phenylamide, 3-amino-4-methoxycarbonyl-benzoic acid amide, 3-amino-4-methoxycarbonyl-benzoic acid phenylamide, 3-amino-4-methoxycarbonyl-benzoic acid 2', 5'-dichloro-phenylamide, 3-amino-4-methoxy-benzenesulphonic acid methylamide, 3-amino-4-methoxy-benzenesulphonic acid diethylamide, 2,5-dimethoxy-4-aminobenzenesulphonic acid methylamide, 2-methyl-5-methoxy-4-aminobenzenesulphonic acid methylamide, 3-amino-4-methyl-benzenesulphonic acid phenylamide, 4-amino-2,5-dimethoxy-benzenesulphonic acid methylamide, 4-amino-2-methyl-5-methoxy-benzenesulphonic acid methylamide, 2-chloro-1-amino-naphthalene, 1-amino-2-methoxy-naphthalene, 1-amino-4-nitro-naphthalene, 2-amino-5-nitro-naphthalene, 1-amino-2-chloro-anthraquinone, 2-amino-3-chloro-anthraquinone, 2-aminothiazole, 2-amino-4-methyl-thiazole, 2-amino-5-chloro-thiazole, 2-amino-5-nitro-thiazole, 2-amino-4-methyl-thiazole-5-carboxylic acid methyl ester, 2-amino-4-methyl-thiazole-5-carboxylic acid amide, 2-amino-4-methyl-thiazole-5-carboxylic acid dimethylamide, 2-amino-benzthiazole, 2-amino-6-methylbenzthiazole, 2-amino-5-methoxy-benzthiazole, 2-amino-6-methoxy-benzthiazole, 2-amino-6-chloro-benzthiazole, 2-amino-6-methylsulphonyl-benzthiazole, 6-methyl-2-(4-aminophenyl)-benzthiazole, 5-amino-3-phenyl-1,2,4-thiadiazole, 2-amino-4-methyl-carboxtyril, 6-amino-4-methyl-2-chloro-carbostyril, 3-amino-4-methoxy-benzoxazole and 6-amino-2,4-dihydroxy-quinazoline.

The pyrimidine derivatives, employed as coupling components, of the formula V

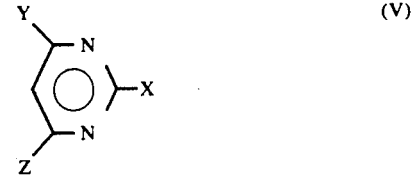

wherein
X, Y and Z have the meaning mentioned in connection
with the formula I can be prepared according to known methods (see, for example, D.J. Brown, The Pyrimidines, and D.J. Brown, The Pyrimidines Supplement I in The Chemistry of Heterocyclic Compounds, edited by A. Weissberger and E.C. Taylor, Wiley-Interscience, New York, 1962 and 1970). For example, urea or guanidine derivatives of the formula VI

wherein
X has the abovementioned meaning
are cyclised with malonic ester, cyanoacetic ester or malodinitrile.

The following may be mentioned as examples of suitable coupling components: 2-amino-4,6-dihydroxypyrimidine, 4-amino-2,6-dihydroxy-pyrimidine, 4,6-diamino-2-hydroxy-pyrimidine, 2-cyanamino-4,6-dihydroxy-pyrimidine, 2-cyanamino-4-amino-6-hydroxy-pyrimidine, 2-cyanamino-4,6-diamino-pyrimidine, 2-ureido-4,6-dihydroxy-pyrimidine, 2-ureido-4-amino-4-hydroxypyrimidine, 2-ureido-4,6-diamino-6-hydroxy-pyrimidine, 2-acetylamino-4,6-dihydroxy-pyrimidine, 2-acetylamino-4-amino-6-hydroxy-pyrimidine, 2-acetylamino-4,6-diamino-pyrimidine, 2-benzoylamino-4,6-dihydroxy-pyrimidine, 2-benzoylamino-4-amino-6-hydroxy-pyrimidine, 2-benzoylamino-4,6-diamino-pyrimidine, 2-methylsulphonylamino-4,6-dihydroxy-pyrimidine, 2-methylsulphonylamino-4-amino-6-hydroxy-pyrimidine, 2-methylsulphonylamino-4,6-diamino-pyrimidine, 2-guanidino-4,6-dihydroxypyrimidine, 2-guanidino-4-amino-6-hydroxy-pyrimidine, 2-guanidino-4,6-diamino-pyrimidine, 2-phenylsulphonylamino-4,6-dihydroxy-pyrimidine, 2phenylsulphonylamino-4-amino-6-hydroxy-pyrimidine and 2-phenylsulphonylamino-4,6-diamino-pyrimidine.

The dyestuffs according to the invention are obtained by diazotising the amines A-NH$_2$ and reacting them with coupling components of the formula III. This is suitably carried out in aqueous solution.

It is frequently of advantage to carry out the reaction in the presence of a non-ionic, cationic or anionic dispersing agent, for example an alkylsulphonate and/or a polycondensation product of octyl alcohol and ethylene oxide and/or in the presence of an organic solvent. As the latter, it is possible to use completely or partially water-miscible compounds, such as alcohols, for example methyl alcohol or ethyl alcohol, glycol, glycol monomethyl ether, butylglycol, lower ketones, such as acetone, and tertiary nitrogen compounds, such as pyridine, dimethylformamide or N-methylpyrrolidone, but also water-immiscible, optionally halogenated or nitrated, hydrocarbons, such as toluene, chlorobenzene or nitrobenzene. Optionally, coupling auxiliaries, for example urea, can also be added.

A further possible method of preparation is to couple malonic ester, cyanoacetic ester or malodinitrile with the corresponding diazotised amine and to condense the resulting azo compound, in accordance with French Pat. Spec. No. 1,453,812 with a compound of the formula

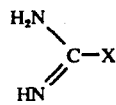

wherein
X has the abovementioned meaning.

Azo dyestuffs which contain, as X, the radical of an acylated amino group, as defined on page 2, can also be prepared by acylating the azo dyestuff VII

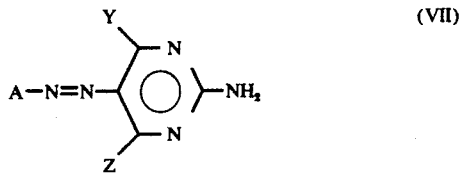

with corresponding acyl halides.

The dyestuffs are isolated in accordance with generally known methods, washed, dried and powdered. They can then be employed direct as pigments. However, at times it is advantageous to subject the resulting compounds to an aftertreatment, to improve their properties, especially the softness of the particles and the tinctorial strength, by heating the compounds in an organic solvent, such as n-butanol, pyridine, dimethylformamide, benzene, toluene, chlorobenzene or nitrobenzene.

The new dyestuffs are sparingly soluble in the customary solvents. They are therefore suitable for pigmenting lacquers of all kinds, for the preparation of printing inks, distempers or paints containing binders, and for the bulk dyeing of synthetic, semi-synthetic or natural macromolecular substances, such as polyvinyl chloride, polystyrene, polyamide or polyethylene. They can also be used for the spin dyeing of natural, regenerated or artificial fibres, for example of cellulose, polyester, polycarbonate, polyacrylonitrile or polyamide fibres, and for the printing of textiles and paper. It is possible to prepare, from these pigments, finely divided, stable, aqueous pigment dispersions, by grinding or kneading in the presence of non-ionic, anionic or cationic surface-active agents; these dispersions can be used, for example, for pigmenting dispersion paints and other paints, for colouring paper, for pigment printing of textiles or for spin dyeing of viscose.

EXAMPLE 1

15.1 g of 2-aminobenzoic acid methyl ester are stirred into 100 ml of water and 30 ml of 10 N hydrochloric acid are added at 0° C. The compound is diazotised with 7 g of NaNO$_2$ in 20 ml of water, the mixture is stirred for a further half hour and the excess nitrite is destroyed with amidosulphonic acid.

17.3 g of 2-cyanamino-4-amino-6-hydroxy-pyrimidine are dissolved, as the sodium salt, in 250 ml of water. 1 g of a mixture of a long-chain alkylsulphonate and the product of oleyl alcohol (1 mol) and ethylene oxide (20 mols), and 2 g of resin soap, are then added. The mixture is cooled to 10° C and precipitated with 25 ml of 5 N hydrochloric acid. The diazonium salt solution is allowed to run into this mixture, and the reaction mixture is buffered by addition of 100 ml of a 20% strength sodium acetate solution. The mixture is then warmed to 60° C., kept at this temperature until the coupling is complete, and then heated to the boil for 5 minutes. The product is then filtered off hot, washed with water until free of salt, and dried at 95° C. 32.6 g of a yellow pigment of the formula

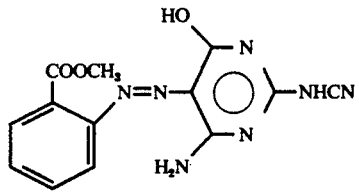

are obtained.

If 35 g of the above colourant are ground with 65 g of linseed oil with addition of 1 g of drier (50% strength Co naphthenate in white spirit), a printing ink of low viscosity is obtained, which gives yellow offset prints of high brilliance, tinctorial strength and gloss and good fastness to light and to overlacquering. If this printing ink is used in letterpress printing, heliographic printing, lithographic printing or gravure printing, it gives yellow prints with similar properties.

EXAMPLE 2

18.5 g of 4-chloro-2-aminobenzoic acid methyl ester are dissolved in 300 ml of glacial acetic acid and 30 ml of propionic acid at 40° C. The solution is cooled to 10° C and diazotisation is carried out with 28.3 g of a 45% strength solution of nitrosylsulphuric acid in sulphuric acid. The mixture is stirred for a further hour and the excess nitrosylsulphuric acid is destroyed by adding urea.

17.3 g of 2-cyanamino-4-amino-6-hydroxypyrimidine are dissolved, as the sodium salt, in 250 ml of water and 1 g of a mixture of alkylsulphonate and the product of oleyl alcohol (1 mol) and ethylene oxide (20 mols) is added. The whole is cooled to 10° C and precipitated with 25 ml of 5 N hydrochloric acid. The diazonium salt solution is allowed to run slowly into this mixture, and the whole is buffered with 100 ml of a 20% strength sodium acetate solution and stirred for half an hour. 50 ml of pyridine are then added, and the mixture is stirred for a further 5 minutes and heated to the boil. After 5 minutes, the product is filtered off hot, washed with water and dried at 50° C. 30.8 g of a yellow pigment of the formula

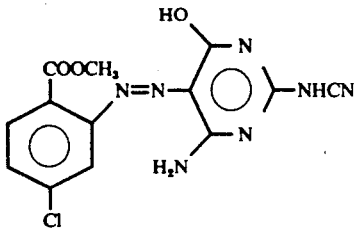

are obtained.

8 g of the finely divided colourant are dispersed in a stoving lacquer of 25 g of coconut oil alkyl resin (40% coconut oil), 10 g of melamine resin, 5 ml of toluene and 7 ml of glycol monomethyl ether in a ball mill. The mixture is applied to the base which is to be lacquered, the lacquer is cured by stoving at 130° C, and deep, brilliant yellow lacquerings with good fastness to overlacquering and very good fastness to light are obtained.

EXAMPLE 3

15.75 g of 5-chloro-2-amino-anisole are suspended in 100 ml of water and 25 ml of 10 N hydrochloric acid. Diazotisation is carried out at 0° C with a solution of 7 g of sodium nitrite in 20 ml of water, the mixture is stirred for a further hour and excess nitrous acid is removed with amidosulphonic acid.

17.3 g of 2-cyanamino-4-amino-6-hydroxypyrimidine are dissolved in 250 ml of water and the solution is stirred with 1 g of a long-chain alkylsulphonate and 2 g of resin soap. 25 ml of a 5 N acetic acid solution are added to the above solution at 10° C. The diazonium salt solution is introduced and the reaction mixture is brought to pH 4–5 by addition of 20 g of sodium acetate in 100 ml of water. After completion of coupling, the mixture is heated to the boil for 5 minutes and the product is filtered off hot and washed with hot water until free of salt. After drying at 50° C., 29 g of a red pigment of the formula

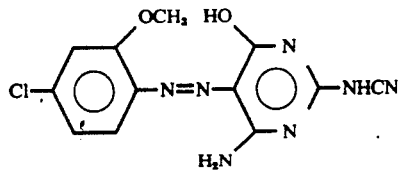

are obtained.

6 g of this colourant are ground into 100 g of a nitrocellulose lacquer which consists of 44 g of collodion cotton (low viscosity, 35% strength), 5 g of dibutyl phthalate, 40 g of ethyl acetate, 20 g of toluene, 4 g of butanol and 10 g of glycol monomethyl ether. After brushing out and drying, red lacquerings of very good fastness to light and good fastness to overlacquering are obtained.

EXAMPLE 4

17 g of 4-chloro-3-amino-benzoic acid amide are dissolved in 140 ml of water with the aid of 30 ml of 10 N hydrochloric acid at 70° C. A solution 7 g of sodium nitrite in 20 ml of water is added whilst cooling with ice, the mixture is stirred for a further half hour and the excess nitrous acid is destroyed with amidosulphonic acid.

17.3 g of 2-cyanamino-4-amino-6-hydroxy-pyrimidine are precipitated in the form of the sodium salt, as indicated in Example 2. The diazonium salt solution is allowed to run into this suspension and the mixture is buffered with 100 ml of a 25% strength sodium acetate solution. The reaction mixture is slowly heated to 60° C, kept at this temperature until the coupling is complete and then heated to the boil. The product is filtered off hot and washed with water.

The paste, which is still moist, is azeotropically dehydrated in 250 ml of toluene and the product is filtered off hot, washed with toluene and dried. 33.2 g of a yellow pigment are obtained.

0.5 g of the pigment are used to colour a mixture of 65 g of polyvinyl chloride, 33 g of diisooctyl phthalate, 2 g of dibutyl-tin mercaptide and 0.5 g of titanium dioxide on a mixing mill at 165° C. A yellow-coloured mass is obtained, which can be used for the production of films or mouldings. The brilliant colouration is distinguished by good fastness to light and to migration.

The table which follows lists further dyestuffs. They can be prepared by reacting the amines mentioned in column I, as diazonium compounds, with the coupling components mentioned in column II, analogously to Examples 1 to 4. Column III indicates the colour shade which is obtained when the pigment is worked into a printing ink in the manner indicated in Example 1.

| Example No. | I | II | III |
|---|---|---|---|
| 5 | 4-Nitroaniline | 2-Cyanamino-4-amino-6-hydroxy-pyrimidine | brown-yellow |
| 6 | 4-Chloro-2-nitroaniline | " | reddish-tinged yellow |
| 7 | 4-Methyl-2-nitroaniline | " | orange |
| 8 | 2-Methyl-4-nitroaniline | " | yellow |
| 9 | 2-Methyl-5-nitroaniline | " | greenish-tinged yellow |
| 10 | 4-Chloroaniline | " | reddish-tinged yellow |
| 11 | 2,5-Dichloroaniline | " | reddish-tinged yellow |
| 12 | 2,5-Dichloroaniline | " | greenish-tinged yellow |
| 13 | 3,4-Dichloroaniline | " | greenish-tinged yellow |
| 14 | 2,4,5-Trichloroaniline | " | yellow |
| 15 | 2-Methyl-4-chloroaniline | " | orange |
| 16 | 2-Methyl-5-chloroaniline | " | greenish-tinged yellow |
| 17 | 2-Cyano-5-chloroaniline | " | greenish-tinged yellow |

-continued

| Example No. | I | II | III |
|---|---|---|---|
| 18 | 2-Chloro-5-trifluoromethylaniline | " | greenish-tinged yellow |
| 19 | 4-Chloro-2-trifluoromethylaniline | " | greenish-tinged yellow |
| 20 | 2,4-Dimethoxyaniline | " | bluish-tinged red |
| 21 | 2,4-Dimethoxy-5-chloroaniline | " | blue-red |
| 22 | 2,5-Dimethyl-4-chloroaniline | 2-Cyanamino-4-amino-6-hydroxy-pyrimidine | red |
| 23 | 2,5-Dimethyl-4-nitroaniline | " | orange |
| 24 | 2-Methoxy-5-methylaniline | " | orange |
| 25 | 4-Methoxy-2-methylaniline | " | bluish-tinged red |
| 26 | 2-Methoxy-5-methyl-4-chloroaniline | " | orange |
| 27 | 2-Methoxy-4-nitroaniline | " | yellowish-tinged red |
| 28 | 2-Methoxy-5-nitroaniline | " | greenish-tinged yellow |
| 29 | 4-Methoxy-2-nitroaniline | " | red |
| 30 | 2-Methoxy-5-chloroaniline | " | orange |
| 31 | 2-Methoxy-4,5-dichloroaniline | " | orange |
| 32 | 2-Methoxy-5-chloro-nitroaniline | " | orange |
| 33 | 3-Amino-4-methoxy-phenyl-ethylsulphone | " | yellow |
| 34 | 3-Amino-4-methoxy-phenyl-benzylsulphone | " | yellow |
| 35 | 3-Amino-4-methoxy-diphenylsulphone | " | yellow |
| 36 | 2-Amino-5-chloro-diphenyl ether | " | reddish-tinged yellow |
| 37 | 2-Amino-4,4'-dichloro-diphenyl ether | " | yellow |
| 38 | 2-Amino-4,6-dichloro-diphenyl ether | 2-Cyanamino-4-amino-6-hydroxy-pyrimidine | greenish-tinged yellow |
| 39 | 4-Amino-5-methoxy-benzenesulphonic acid 4-nitrophenyl ester | " | yellow |
| 40 | 4-Acetylamino-2,5-dichloroaniline | " | red |
| 41 | 4-Acetylamino-2-methyl-5-methoxy-aniline | " | brown-red |
| 42 | 4-Benzoylamino-2-chloro-5-methoxy-aniline | " | brown-red |
| 43 | 4-Benzoylamino-2-methoxy-5-methyl-aniline | " | brown-red |
| 44 | 4-Nitro-2-amino-benzoic acid methyl ester | " | greenish-tinged yellow |
| 45 | 5-Chloro-2-amino-benzoic acid methyl ester | " | yellow |
| 46 | 4-Methoxy-2-amino-benzoic acid methyl ester | " | reddish-tinged yellow |
| 47 | 4-Methyl-3-amino-benzoic acid methyl ester | " | yellow |
| 48 | 4-Amino-benzoic acid amide | " | yellow |
| 49 | 3-Amino-4-methyl-benzoic acid amide | " | yellow |
| 50 | 3-Amino-4-methoxy-benzoic acid amide | " | reddish-tinged yellow |
| 51 | 3-Amino-benzoic acid 2',4'-dimethyl-phenylamide | 2-Cyanamino-4-amino-6-hydroxy-pyrimidine | yellow |
| 52 | 3-Amino-4-chloro-benzoic acid 2',4'-dichloro-phenylamide | " | greenish-tinged yellow |
| 53 | 3-Amino-4-methoxy-benzoic acid phenylamide | " | reddish-tinged yellow |
| 54 | 4-Amino-2,5-dimethoxy-benzene-sulphonic acid amide | " | red |
| 55 | 4-Amino-2,5-dimethoxy-benzene-sulphonic acid methylamide | " | red |
| 56 | 4-Amino-2-methyl-5-methoxy-benzene-sulphonic acid methylamide | " | reddish-tinged yellow |
| 57 | 4-Methyl-2-nitroaniline | 2-Guanidino-4-amino-6-hydroxy-pyrimidine | yellow |
| 58 | 4-Chloro-2-methylaniline | " | yellow |
| 59 | 4-Methoxy-2-nitroaniline | " | orange |
| 60 | 2-Methoxy-4-chloroaniline | " | yellow |
| 61 | 2-Methoxy-5-methyl-4-chloroaniline | " | yellow |
| 62 | 2-Aminobenzoic acid methyl ester | " | yellow |
| 63 | 3-Amino-4-chlorobenzoic acid amide | " | greenish-tinged yellow |
| 64 | 4-Methyl-2-nitroaniline | 2-Ureido-4-amino-6-hydroxy-pyrimidine | yellow |
| 65 | 4-Chloro-2-methylaniline | 2-Ureido-4-amino-6-hydroxy-pyrimidine | yellow |
| 66 | 4-Methoxy-2-nitroaniline | " | reddish-tinged yellow |
| 67 | 2-Methoxy-4-chloroaniline | " | yellowish-tinged red |
| 68 | 2-Methoxy-5-methyl-4-chloroaniline | " | yellowish-tinged red |
| 69 | 2-Amino-benzoic acid methyl ester | " | yellow |
| 70 | 3-Amino-4-choloro-benzoic acid amide | " | yellow |
| 71 | 3-Amino-4-methyl-benzoic acid amide | " | yellow |
| 72 | 4-Methyl-2-nitroaniline | 2-Acetylamino-4-amino-6-hydroxy-pyrimidine | orange |
| 73 | 2-Methyl-5-chloroaniline | " | yellow |
| 74 | 4-Methoxy-2-nitroaniline | " | red |
| 75 | 2-Methoxy-4-chloroaniline | " | orange |
| 76 | 2-Methoxy-5-methyl-4-chloroaniline | " | red |
| 77 | 2-Aminobenzoic acid methyl ester | " | yellow |
| 78 | 3-Amino-4-chloro-benzoic acid amide | " | yellow |
| 79 | 2-Methyl-4-chloroaniline | 4-Amino-2,6-dihydroxy-pyrimidine | yellow |
| 80 | 2-Cyano-5-chloroaniline | " | greenish-tinged yellow |
| 81 | 2-Methoxy-4-chloroaniline | " | reddish-tinged yellow |
| 82 | 2-Methoxy-4,5-dichloroaniline | 4-amino-2,6-dihydroxy-pyrimidine | reddish-tinged yellow |
| 83 | 4-Benzoylamino-2-methoxy-5-methyl-aniline | " | red-brown |
| 84 | 2-Aminobenzoic acid methyl ester | " | greenish-tinged yellow |

-continued

| Example No. | I | II | III |
|---|---|---|---|
| 85 | 4-Amino-3-methyl-benzoic acid amide | " | yellow |
| 86 | 2-Amino-benzoic acid methyl ester | 2-Cyanamino-4,6-dihydroxy-pyrimidine | yellow |
| 87 | " | 2-Ureido-4,6-dihydroxy-pyrimidine | yellow |
| 88 | 4-Methyl-2-nitroaniline | " | reddish-tinged yellow |
| 89 | 2-Methoxy-4-chloroaniline | 2-Cyanamino-4,6-diamino-pyrimidine | yellowish-tinged red |
| 90 | 2-Amino-benzoic acid methyl ester | " | yellow |
| 91 | 3-Amino-4-methyl-benzoic acid amide | " | yellow |
| 92 | 2-Amino-1,4-dicarboxylic acid dimethyl ester | 2-Cyanamino-4-amino-6-hydroxy-pyrimidine | yellow |
| 93 | 2-Amino-1-carboxylic acid methyl ester-4-carboxylic acid anilide | 2-Cyanamino-4-amino-6-hydroxy-pyrimidine | yellow |
| 94 | 2-Amino-1-carboxylic acid methyl ester-4-carboxylic acid 2,5-dichloroanilide | 2-Cyanamino-4-amino-6-hydroxy-pyrimidine | yellow |

We claim:
1. An azo pigment which is free from groups conferring solubility in water of the formula

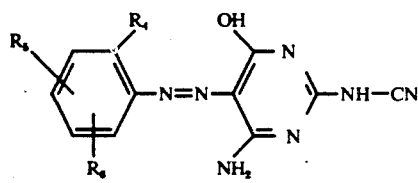

wherein
R₄ represents carbo-C₁-C₄-alkoxy or C₁-C₄-alkoxy;
R₅ represents hydrogen, chlorine, methyl, ethyl, methoxy, ethoxy, cyano, carbo-C₁-C₄-alkoxy or carbonamide unsubstituted or mono- or disubstituted by methyl or phenyl; and
R₆ represents hydrogen, chlorine, methyl or methoxy.

2. Azo pigment of claim 1 of the formula

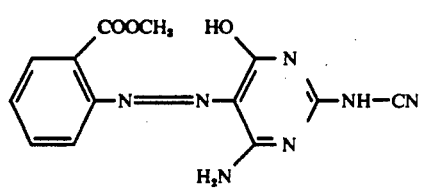

3. Azo pigment of claim 1 of the formula

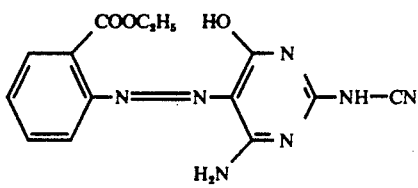

4. Azo pigment of claim 1 of the formula

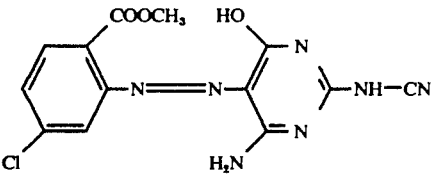

5. Azo pigment of claim 1 of the formula

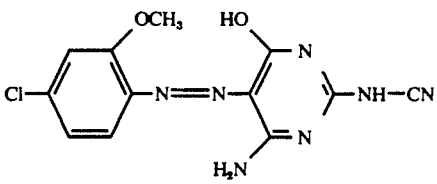

6. Azo pigment of claim 1 of the formula

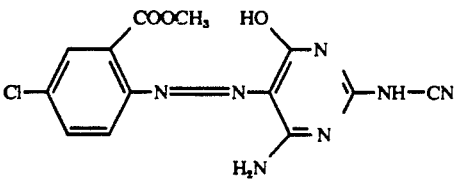

7. Azo pigment of claim 1 of the formula

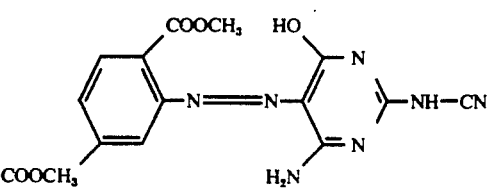

* * * * *